(12) United States Patent
Berbee et al.

(10) Patent No.: US 9,416,209 B2
(45) Date of Patent: Aug. 16, 2016

(54) METHOD TO IMPROVE THE FEEDING OF A CARBOXYLIC ACID COMONOMER INTO A HIGH PRESSURE REACTOR

(71) Applicant: Dow Global Technologies LLC, Midland, MI (US)

(72) Inventors: Otto J. Berbee, Hulst (NL); Jeffery S. Bradley, Missouri City, TX (US); Stefan Hinrichs, Wondelgem (BE)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/438,930

(22) PCT Filed: Dec. 27, 2013

(86) PCT No.: PCT/US2013/078020
§ 371 (c)(1),
(2) Date: Apr. 28, 2015

(87) PCT Pub. No.: WO2014/106067
PCT Pub. Date: Jul. 3, 2014

(65) Prior Publication Data
US 2015/0299357 A1    Oct. 22, 2015

Related U.S. Application Data

(63) Continuation of application No. PCT/US2013/032501, filed on Mar. 15, 2013.

(60) Provisional application No. 61/747,003, filed on Dec. 28, 2012.

(51) Int. Cl.
*C08F 2/00* (2006.01)
*C08F 20/06* (2006.01)
(Continued)

(52) U.S. Cl.
CPC ............... *C08F 220/06* (2013.01); *C08F 2/00* (2013.01); *C08F 210/02* (2013.01); *C08F 218/08* (2013.01); *C08F 220/14* (2013.01); *C08F 220/18* (2013.01); *C08F 2220/1808* (2013.01)

(58) Field of Classification Search
CPC ........ C08F 2/00; C08F 220/06; C08F 220/14; C08F 210/02; C08F 220/18; C08F 218/08; C08F 2220/1808
USPC ................. 526/212, 318.6, 329, 331
See application file for complete search history.

(56) References Cited

U.S. PATENT DOCUMENTS

| 3,658,741 A | 4/1972 | Knutson et al. | |
| 4,252,924 A * | 2/1981 | Chatterjee | C08F 8/44 525/327.8 |

(Continued)

FOREIGN PATENT DOCUMENTS

| GB | 1176696 A | 1/1970 |
| WO | WO 2012/044503 | * 4/2012 |

OTHER PUBLICATIONS

PCT/US2013/078020 International Search Report and Written Opinion mailed Mar. 20, 2014.
(Continued)

*Primary Examiner* — William Cheung

(57) ABSTRACT

The invention provides a method of injecting a compressed "comonomer/compound mixture," comprising a "comonomer comprising a carboxylic acid," and at least one compound, into at least one reactor; said method comprising, adding the at least one compound to the comonomer to form the "comonomer/compound mixture," prior to compressing and injecting the mixture into the reactor; and wherein the crystallization temperature, at pressure P, of the "comonomer/compound mixture" is at least 5° C. lower than the crystallization temperature, at pressure P, of the comonomer, without the presence of the at least one compound; and wherein the pressure P is greater than 500 bar; and wherein the molar ratio of the at least one compound to the comonomer in the mixture is from 1/10 to 1/1; and wherein the comonomer/compound mixture comprises greater than, or equal to, 30 weight percent of the comonomer, based on the weight of the comonomer/compound mixture; and wherein the melting temperature, at atmospheric pressure, of the at least one compound is less than the melting temperature, at atmospheric pressure, of the comonomer. The invention also provides a method of forming an ethylene-based polymer, as described herein.

16 Claims, 5 Drawing Sheets

(51) Int. Cl.
  *C08F 220/10*  (2006.01)
  *C08F 218/02*  (2006.01)
  *C08F 220/06*  (2006.01)
  *C08F 220/14*  (2006.01)
  *C08F 210/02*  (2006.01)
  *C08F 218/08*  (2006.01)
  *C08F 220/18*  (2006.01)

(56) References Cited

U.S. PATENT DOCUMENTS

| | | |
|---|---|---|
| 4,351,931 A | 9/1982 | Armitage |
| 4,417,035 A | 11/1983 | Oeder et al. |
| 4,599,392 A | 7/1986 | McKinney et al. |
| 5,028,674 A | 7/1991 | Hatch et al. |
| 5,057,593 A | 10/1991 | Marshall et al. |
| 8,871,876 B2 * | 10/2014 | Berbee .................. C08F 2/01 525/411 |
| 2013/0184419 A1 | 7/2013 | Berbee et al. |

OTHER PUBLICATIONS

PCT/US2013/078020 International Preliminary Report on Patentability mailed Jul. 9, 2015.

Dow Global Technologies LLC European Communication pursuant to Rules 161(1) and 162 EPC dated Aug. 4, 2015.

* cited by examiner autoclave

Melting point of acrylic acid/component mixture and AA as function of pressure

Melting point reduction using acrylic acid:cosolvent at a molar ratio = 4:1 and 2500 bar pressure as function of dielectric constant Melting point reduction using acrylic acid/cosolvent at a molar ratio = 2:1, and 2500 bar pressure as function of dipole moment Melting point of AA/Compound systems with varying composition at 2500 bar

- AA:EA system
- AA:acetone system
- AA:MEK system
- AA:1-propanol system
- AA:tert-butanol system

METHOD TO IMPROVE THE FEEDING OF A CARBOXYLIC ACID COMONOMER INTO A HIGH PRESSURE REACTOR

REFERENCE TO RELATED APPLICATIONS

This application claims priority to International Application No. PCT/US2013/078020, filed Dec. 27, 2013, which claims the benefit of U.S. Provisional Application No. 61/747,003, filed Dec. 28, 2012, and is a continuation application of PCT/US2013/032501, filed Mar. 15, 2013.

FIELD OF THE INVENTION

This invention relates to a feeding mode of carboxylic comonomer using new polymerization processes to make ethylene-based interpolymers, and to such interpolymers. Notably, the polymerization process involves one or more compounds, such as polar chain transfer agents and/or secondary polar comonomers.

BACKGROUND OF THE INVENTION

There are several inherent problems associated to the use of carboxylic acid comonomers including the following: a) the acidity of the acid comonomer can cause corrosion problems, b) the high reactivity and self-polymerizability of the acid comonomers require them to be stored at low temperature conditions and preferably in the liquid state, c) carboxylic acids require stabilization with either nitroxyl containing inhibitors, like phenolthiazine, or mono-methyl-ether of hydroquinone (MEHQ) activated with oxygen, and the nitroxyl containing inhibitors can inhibit or retard polymerization, while the oxygen present in the MEHQ can act as an initiator when applied at elevated temperatures.

Further complications could arise from the use of carboxylic acid monomers in high pressure free radical polymerization, which is carried at pressures preferably above 1000 bar, more preferably above 1500 bar and most preferably above 2000 bar. At these elevated pressures, the melting point of carboxylic acid monomer is significantly increased. In the high pressure process, the carboxylic acid has to be fed to the process in the liquid state, and is moved through the compression, the polymerization, and the separation sections, preferably in the gaseous phase (dissolved and diluted in gaseous or super critical ethylene), in order to avoid self polymerization of liquid or solid carboxylic acid monomer to carboxylic acid homopolymer.

The high pressure polymerization process makes use of reciprocating plunger compressors to pressurize the ethylene/carboxylic acid monomer feed and recycle streams. It is known that application of carboxylic acid monomer negatively affects the reliability of rotating and reciprocating equipment, due to its corrosion and self polymerization potential. The formation of carboxylic acid homopolymer in the sealing ring or bearing areas of the rotating and moving equipment items in compressors, plunger pumps, agitators etc, could hinder, or stop, lubrication, and could cause friction and extra heat formation, which could lead to equipment failure. Compressor reliability could be improved by decreasing the carboxylic acid monomer level in the ethylene stream(s) to be compressed through feeding all, or a part of, the make-up carboxylic acid monomer directly at high pressure to the reactor.

Feeding carboxylic acid monomer to a high pressure reactor requires a high pressure diaphragm or reciprocating plunger pump. These pumps have to be operated at higher temperatures in order to avoid solidification of the carboxylic acid monomer. High pressure pump operation with carboxylic acid monomer is challenging, unreliable, if not impossible, by the higher temperature operation required to avoid solidification of the carboxylic acid monomer, the compression energy (further heat up) and the self-polymerization potential. Thus there remains a need to pump carboxylic acid monomer reliably at lower temperatures to pressures above 1000 bar.

Conventional polymerization processes, include those described in U.S. Pat. Nos. 5,028,674, 4,417,035, 4,351,931, 5,057,593, 4,599,392, 4,252,924, 365,874 and GB1176696A. However, none of these processes meet the requirements and needs, discussed above, for high pressure free radical polymerizations. All these requirements and unmet needs have been met by the following invention. The invention provides for the improved feeding of carboxylic acid monomer with the help of a polar compound, which reduces significantly the melting point of carboxylic acid mixtures, thus allowing direct feeding of the carboxylic acid monomer to the reactor and improving secondary compressor reliability. Furthermore the invention allows wide melt index control capability, while the reactor and compressor phase equilibria can be positively influenced for a wide range (MI and carboxylic acid monomer level) of ethylene-carboxylic acid copolymers.

SUMMARY OF INVENTION

The invention provides a method of injecting a compressed "comonomer/compound mixture," comprising a "comonomer comprising a carboxylic acid," and at least one compound, into at least one reactor;

said method comprising, adding the at least one compound to the comonomer to form the "comonomer/compound mixture," prior to compressing and injecting the mixture into the reactor; and wherein the crystallization temperature, at pressure P, of the "comonomer/compound mixture" is at least 5° C. lower than the crystallization temperature, at pressure P, of the comonomer, without the presence of the at least one compound; and wherein the pressure P is greater than 500 bar; and wherein the molar ratio of the at least one compound to the comonomer in the mixture is from 1/10 to 1/1; and wherein the comonomer/compound mixture comprises greater than, or equal to, 30 weight percent of the comonomer, based on the weight of the comonomer/compound mixture; and wherein the melting temperature, at atmospheric pressure, of the at least one compound is less than the melting temperature, at atmospheric pressure, of the comonomer.

The invention also provides a method of forming an ethylene-based polymer, said method comprising polymerizing a comonomer, comprising a carboxylic acid, in the presence of ethylene and at least one free radical initiator; and wherein at least one compound is added to the comonomer to form a "comonomer/compound mixture;" and then the mixture is compressed, and injected into at least one reactor; and wherein the crystallization temperature, at pressure P, of the "comonomer/compound mixture" is at least 5° C. lower than the crystallization temperature, at pressure P, of the comonomer, without the presence of the at least one compound; and wherein the pressure P is greater than 500 bar; and wherein the molar ratio of the at least one compound to the comonomer in the mixture is from 1/10 to 1/1; and wherein the comonomer/compound mixture comprises greater than, or equal to, 30 weight percent of the comonomer, based on the weight of the comonomer/compound mixture; and wherein the melting temperature, at atmospheric pressure, of the at least one compound is less than the melting temperature, at atmospheric pressure, of the comonomer.

DETAILED DESCRIPTION

Figure 1:
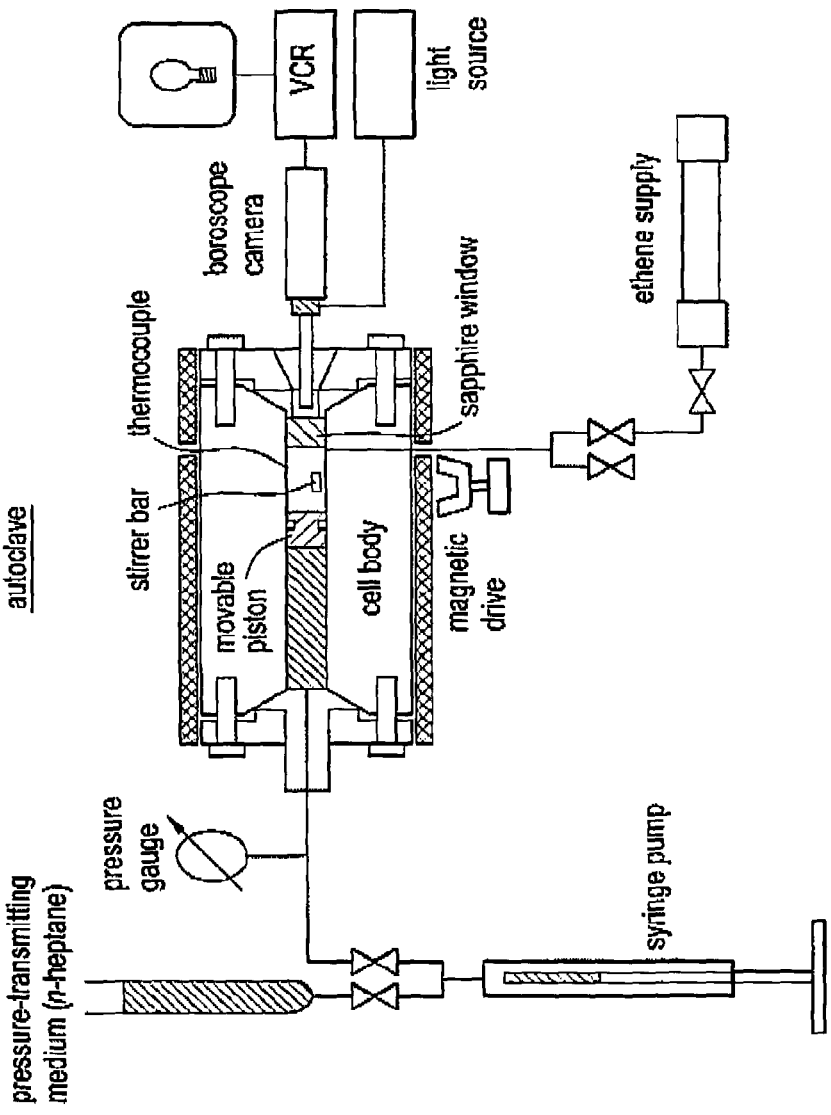
FIG. 1 is a schematic of a high-pressure cell used in the present invention.

As discussed above, the invention provides, in a first aspect, a method of injecting a compressed "comonomer/compound mixture," comprising a "comonomer comprising a carboxylic acid," and at least one compound, into at least one reactor;

said method comprising, adding the at least one compound to the comonomer to form the "comonomer/compound mixture," prior to compressing and injecting the mixture into the reactor; and wherein the crystallization temperature, at pressure P, of the "comonomer/compound mixture" is at least 5° C. lower than the crystallization temperature, at pressure P, of the comonomer, without the presence of the at least one compound; and wherein the pressure P is greater than 500 bar; and wherein the molar ratio of the at least one compound to the comonomer in the mixture is from 1/10 to 1/1; and wherein the comonomer/compound mixture comprises greater than, or equal to, 30 weight percent of the comonomer, based on the weight of the comonomer/compound mixture; and wherein the melting temperature, at atmospheric pressure, of the at least one compound is less than the melting temperature, at atmospheric pressure, of the comonomer.

In a further embodiment, the comonomer, comprising a carboxylic acid, is polymerized in the presence of ethylene and at least one free radical initiator.

An inventive method may comprise a combination of two or more embodiments as described herein.

The invention also provides, in a second aspect, a method of forming an ethylene-based polymer, said method comprising polymerizing a comonomer, comprising a carboxylic acid, in the presence of ethylene and at least one free radical initiator; and wherein at least one compound is added to the comonomer to form a "comonomer/compound mixture;" and then the mixture is compressed, and injected into at least one reactor; and wherein the crystallization temperature, at pressure P, of the "comonomer/compound mixture" is at least 5° C. lower than the crystallization temperature, at pressure P, of the comonomer, without the presence of the at least one compound; and wherein the pressure P is greater than 500 bar; and wherein the molar ratio of the at least one compound to the comonomer in the mixture is from 1/10 to 1/1; and wherein the comonomer/compound mixture comprises greater than, or equal to, 30 weight percent of the comonomer, based on the weight of the comonomer/compound mixture; and wherein the melting temperature, at atmospheric pressure, of the at least one compound is less than the melting temperature, at atmospheric pressure, of the comonomer.

An inventive method may comprise a combination of two or more embodiments as described herein.

The following embodiments apply to both the first and second inventive aspects as described above.

In one embodiment, the pressure P is greater than, 800 bar, further greater than 1000 bar.

In one embodiment, the pressure P is greater than, or equal to, 1200 bar, further greater than, or equal to, 1500 bar, further greater than, or equal to, 1800 bar.

In one embodiment, the pressure P is greater than, or equal to, 2000 bar, further greater than, or equal to, 2500 bar, further greater than, or equal to, 3000 bar, further greater than, or equal to, 3500 bar.

In one embodiment, the pressure P is from "greater than 500 bar" to 5000 bar, further from "greater than 800 bar" to 4000 bar, further from greater than 1000 to 3500 bar.

In one embodiment, the crystallization temperature of the comonomer/compound mixture is reduced by at least 10° C., further by at least 15° C., and further by at least 20° C., relative to the crystallization temperature of the comonomer, without the presence of the at least one compound, and at the same pressure.

In one embodiment, the crystallization temperature of the comonomer is reduced by at least 10° C., further by at least 15° C., and further by at least 20° C., relative to the crystallization temperature of the comonomer, without the presence of the at least one compound, and at the same pressure.

In one embodiment, the crystallization of the comonomer takes place at a pressure P greater than, or equal to, 1500 bar, further greater than, or equal to, 2500 bar, further greater than, or equal to, 3000 bar.

In one embodiment, the molar ratio of the at least one compound to the comonomer is from 1/8 to 1/1, further from 1/6 to 1/1, and further from 1/4 to 1/1.

In one embodiment, the mixture comprises greater than, or equal to, 40 weight percent, further greater than, or equal to, 50 weight percent, further greater than, or equal to, 60 weight percent, further greater than, or equal to, 70 weight percent, of the comonomer, based on the weight of the mixture.

In one embodiment, the at least one compound has a boiling temperature, at atmospheric pressure, greater than, or equal to, 70° C.

In one embodiment, the at least one compound has a boiling temperature, at atmospheric pressure, from 70° C. to 160° C., further from 70° C. to 140° C., further from 70 C to 110° C.

In one embodiment, the at least one compound has a boiling temperature, at atmospheric pressure, less than, or equal to, 160° C., further less than, or equal to, 140° C. In a further embodiment, the at least one compound is an alkylacrylate.

In one embodiment, the at least one compound has a boiling temperature, at atmospheric pressure, greater than, or equal to, 125° C.

In one embodiment, the at least one compound has a boiling temperature, at atmospheric pressure, less than, or equal to, 110° C., further less than, or equal to, 100° C., further less than, or equal to, 90° C. In a further embodiment, the at least one compound is an alkylacrylate.

In one embodiment, the at least one compound has a boiling temperature, at atmospheric pressure, from 70° C. to 160° C.

In one embodiment, the at least one compound has a boiling temperature, at atmospheric pressure, from 70° C. to 110° C., further from 72° C. to 100° C., further from 74° C. to 90° C.

In one embodiment, the at least one compound has a melting temperature, at atmospheric pressure, less than, or equal to, 10° C., further less than, or equal to, 0° C., further less than, or equal to, −10° C.

In one embodiment, the mixture comprises less than 2 weight percent ethylene, further less 1 weight percent ethylene, and further less than 0.5 weight percent ethylene, based on the weight of the mixture.

In one embodiment, the at least one compound comprises at least one heteroatom (for example, O, N, P or S, and preferably O).

In one embodiment, the at least one compound has a "dielectric constant" greater than 3.0 (see references 11 and 12 below).

In one embodiment, the at least one reactor is present in a reactor configuration comprising at least one autoclave reactor. In a further embodiment, the reactor configuration comprises at least one autoclave and at least one tubular reactor.

In one embodiment, the pressure in the at least one reactor is greater than, or equal to, 1000 bar, further greater than, or equal to, 1200 bar, further greater than, or equal to, 1500 bar.

In one embodiment, the method further comprises polymerizing the comonomer in the presence of ethylene and at least one free radical initiator, and further at a pressure greater than 1000 bar. In a further embodiment, the polymerization takes places in a reactor configuration comprising at least one autoclave reactor. In a further embodiment, the polymerization takes place in an autoclave-tube combination.

In one embodiment, the at least one reactor is present in a reactor configuration, in which non converted ethylene is recycled back to a reactor.

In one embodiment, the at least one reactor is present in a reactor configuration that comprises a split ethylene feed configuration, and further, a part of the ethylene is fed to the top zone of a reactor. In a further embodiment, the ethylene fed to the top zone is used to cool an internal agitator motor. Further, this ethylene is acid monomer free or contains a low amount of commoner (acid comonomer).

In one embodiment, the at least one reactor is present in a reactor configuration, in which the comonomer (for example, acrylic acid (AA)) is injected into an ethylene feed, which is fed directly or indirectly to the top zone of a reactor. In a further embodiment, a CTA is fed primarily the top zone (for example, to narrow MWD of high acid products). In a further embodiment, a polar cosolvent is used during the start up phase for direct comonomer injection.

In one embodiment, the at least one reactor is present in a reactor configuration, in which at least some unreacted ethylene and/or some unreacted comonomer is/are recycled to a reactor inlet. In a further embodiment, the pressure in the at least one reactor is greater than 1000 bar.

In one embodiment, the at least one reactor is present in a reactor configuration, in which a majority of unreacted ethylene and/or a majority of unreacted comonomer is/are recycled to a reactor inlet. In a further embodiment, the pressure in the at least one reactor is greater than 1000 bar. In one embodiment, the level of the at least one compound in a reactor feed is maintained from 1.0 to 10.0 molar percent, further from 1.5 to 8.0 molar percent, further from 2.0 to 6.0 molar percent, based on the total moles of components in the feed.

In one embodiment, the at least one reactor is present in a reactor configuration, in which at least some of the at least one compound is condensed and recycled to one or more comonomer feed stream(s).

In one embodiment, the level of the at least one compound is maintained in a reactor feed from 0.5 to 10.0 molar percent, further from 1.0 to 8.0 molar percent, further from 1.5 to 6.0 molar percent based on the total moles of components in the feed.

In one embodiment, the comonomer contains from 3 to 8 carbon atoms, further from 3 to 6 carbon atoms, further from 3 to 4 carbon atoms.

In one embodiment, the comonomer contains an end vinyl group (—CH=CH$_2$).

In one embodiment, the comonomer contains an internal carbon-carbon double bond (—C=C—).

In one embodiment, the at least one compound is a CTA (chain transfer agent). In a further embodiment, the at least one compound has a chain transfer activity coefficient (Cs at 130° C. and 1360 atm) from 0.0025 to 0.5.

In one embodiment, the at least one compound comprises at least one heteroatom.

In one embodiment, the level of the at least one compound in a reactor feed is maintained from 1 to 10 molar percent, based on the total moles of components in the feed.

In one embodiment, the at least one compound has a chain transfer activity coefficient (Cs at 130° C. and 1360 atm) from 0.0025 to 0.5.

In one embodiment, the at least one compound is a second comonomer.

In one embodiment, the at least one compound comprises an ester group. In a further embodiment, the at least one compound is an alkyl acrylates, an alkylmethacrylates, or a vinyl acetate.

In one embodiment, the at least one compound is an alkylacrylate. Suitable acrylates include methyl, ethyl, propyl, butyl and higher acrylates.

In one embodiment, the at least one compound is an alkylmethacrylate. Suitable methacrylates include methyl, ethyl, propyl, butyl and higher methacrylates.

In one embodiment, at least two compounds are added to the comonomer, and wherein one compound has a higher Cs value than the other compound. In a further embodiment, the ratio of the "Cs value of the compound with the higher Cs value" to the "Cs value of the other compound" is greater than, or equal to, 2, further greater than, or equal to, 3, and further greater than, or equal to, 4.

In one embodiment, the at least one compound contains at least one chemical group selected from the following: an alcohol, a ketone, an aldehyde, an ester, a carboxylic acid, vinyl group, or a combination thereof.

In one embodiment, the at least one compound contains at least one chemical group selected from the following: a ketone, an ester, or a combination thereof. In a further embodiment, the at least one compound is an ester.

In one embodiment, the pressure in the at least one reactor is greater than 500 bar, further greater than, or equal to, 1000 bar, further greater than, or equal to, 1500 bar, further greater than, or equal to, 1700 bar.

In one embodiment, the temperature in the at least one reactor is greater than, or equal to, 170° C., further greater than, or equal to, 200° C., further greater than, or equal to, 220° C.

An inventive method may comprise a combination of two or more embodiments as described herein.

The invention also provides an ethylene-based polymer formed from an inventive method of one or more embodiments described herein.

In one embodiment, the ethylene-based polymer comprises, in the polymerized form, from 1 to 30 weight percent comonomer, further from 3 to 28 weight percent comonomer, and further from 5 to 25 weight percent comonomer, based on the weight of the polymer.

In one embodiment, the ethylene-based polymer has a density from 0.900 to 0.955 g/cc, further from 0.900 to 0.950 g/cc (1 cc=1 cm$^3$).

In one embodiment, the ethylene-based polymer has a melt index (12) from 0.2 to 5000 g/10 min, further from 0.5 to 4000 g/10 min, and further 1 to 3000 g/10 min.

The ethylene-based polymer may comprise a combination of two or more embodiments as described herein.

The invention also provides a composition comprising an ethylene-based polymer formed from an inventive method of one or more embodiments described herein.

In one embodiment, the composition further comprises a second ethylene-based polymer.

In one embodiment, the second ethylene-based polymer is selected from an ethylene/alpha-olefin copolymer, a low density polyethylene (LDPE), a high density polyethylene (HDPE), or a combination thereof.

In one embodiment, the second ethylene-based polymer is a LDPE homopolymer.

In one embodiment, the second ethylene-based polymer is a linear low density polyethylene (LLDPE). Linear low density polyethylenes (LLDPEs) include copolymers of ethylene with one or more alpha-olefins, such as, but not limited to, propylene, butene-1, pentene-1,4-methylpentene-1, pentene-1, hexene-1 and octene-1.

In one embodiment, the composition has a density from 0.900 to 0.955 g/cc, further from 0.900 to 0.950 g/cc (1 cc=1 cm$^3$).

In one embodiment, the composition has a melt index (12) from 0.2 to 5000 g/10 min, further from 0.5 to 4000 g/10 min, and further 1 to 3000 g/10 min.

The composition may comprise a combination of two or more embodiments as described herein.

The invention also provides an article comprising at least one component formed from an inventive composition.

In one embodiment, the article is selected from a coating, a film, a foam, a laminate, a fiber, or a tape.

In one embodiment, the article is an aqueous dispersion (for example, a dispersion coating for paper, (fertilizer) granules, etc.).

In one embodiment, the article is an extrusion coating. In another embodiment, the article is a film.

An inventive article may comprise a combination of two or more embodiments as described herein.

High Pressure Free Radical Polymerization, Process Characteristics, and Polymer Products The term "high pressure polymerization process," as used herein, refers to a free radical polymerization process in which homo- and or copolymerization is carried out at an elevated pressure typically of at least 1000 bar (for example, 1000 to 5000 bar) and elevated temperature (for example, 100 to 400° C.) conditions. High molecular weight, normally solid copolymers of ethylene and unsaturated carboxylic acids, such as acrylic acid and methacrylic acid, are well known (see for example, U.S. Pat. No. 3,132,120).

There are two main reactor types to produce high pressure, free radical copolymers of ethylene and unsaturated carboxylic acids, namely the autoclave reactor and the tubular reactor. Generally a tubular reactor is more advantaged for making narrow molecular weight distribution (MWD) polyethylene, due the uniform residence time in tubular reaction zones. The autoclave process enables production of homogeneous, ethylene-carboxylic acid interpolymers, while the tubular process, due to the high reactivity of carboxylic acid, will lead to less homogeneous ethylene-carboxylic acid interpolymers.

The tendency to have undesired phase separation increases, when using carboxylic acid monomer, and deteriorates strongly with increasing carboxylic acid content (see literature references Beyer et al. and Lee et al.—see references 7 and 8 below). In the invention, the level of total polar solvent in polymerization plant can be controlled, and set at a level that will significantly improve phase equilibrium conditions in the reactor, the compressor, and other sections.

All these requirements and unmet needs for high pressure free radical polymerization plants have been met, as discussed herein, by improved feeding of carboxylic acid, with the help of a polar compound, which reduces significantly the melting temperature of carboxylic acid monomer(s) mixtures, thus allowing direct feeding of the carboxylic acid monomer(s) to the reactor, and improving secondary compressor reliability. Furthermore, the present invention allows wide melt index control capability, while phase separations in the reactor and in the compressor phase are reduced. Also, ethylene can be polymerized with carboxylic acid-containing comonomer(s) to produce interpolymers (for example, copolymers and terpolymers) with a wide range of melt indexes and carboxylic acid levels.

Initiators

The process of the present invention is a free radical polymerization process. The type of free radical initiator to be used in the present process is not critical. Free radical initiators that are generally used include organic peroxides, such as peresters, perketals, peroxy ketones, percarbonates and cyclic multifunctional peroxides. These organic peroxide initiators are used in conventional amounts, typically from 0.005 to 0.2 weight percent based on the weight of polymerizable monomers. Other suitable initiators include azodicarboxylic esters, azodicarboxylic dinitriles and 1,1,2,2-tetramethylethane derivatives, and other components capable of forming free radicals in the desired operating temperature range. Peroxides are typically injected as diluted solutions in a suitable solvent, for example, in a hydrocarbon solvent.

Chain Transfer Agents (CTA)

Chain transfer agents or telogens are used to control the melt index in a polymerization process. Chain transfer involves the termination of growing polymer chains, thus limiting the ultimate molecular weight of the polymer material. Chain transfer agents are typically hydrogen atom donors that will react with a growing polymer chain, and stop the polymerization reaction of the chain, and initiate the growth of a new polymer molecule. These agents can be of many different types, from saturated hydrocarbons, or unsaturated hydrocarbons, to aldehydes, ketones or alcohols. By controlling the concentration of the selected chain transfer agent, one can control the length of polymer chains, and, hence the molecular weight, for example, the number average molecular weight, Mn. The melt flow index (MFI or $I_2$) of a polymer, which is related to Mn, is controlled in the same way.

Suitable chain transfer agents include, but are not limited to, aliphatic and olefinic hydrocarbons, such as pentane, hexane, cyclohexane, propene, pentene or hexane; ketones such as acetone, diethyl ketone, methyl ethyl ketone (MEK) or diamyl ketone; aldehydes such as formaldehyde or acetaldehyde, propionaldehyde; and saturated aliphatic aldehyde alcohols such as methanol, ethanol, propanol or butanol. The chain transfer agent may also be a monomeric chain transfer agent. For example, see WO 2012/057975, U.S. 61/579,067 and U.S. 61/664,956.

A further way to influence the melt-index, includes the build up and control, in the ethylene recycle streams, of the compound. Furthermore the melt-index can be influenced by the build up and control of incoming ethylene impurities, like methane and ethane, peroxide dissociation products, like tert-butanol, acetone, etc., and or solvent components used to dilute the initiators. These ethylene impurities, peroxide dissociation products and/or dilution solvent components can act as chain transfer agents.

Polymers

In one embodiment, an ethylene-based polymer of this invention has a density from 0.910 to 0.950, more typically from 0.915 to 0.945, and even more typically from 0.920 to 0.940, grams per cubic centimeter (g/cc or g/cm$^3$). In one embodiment, an ethylene-based polymer of the invention has a melt index ($I_2$) from 0.2 to 5000 grams per 10 minutes (g/10 min) at 190° C./2.16 kg, further from 0.5 to 2000 grams per 10 minutes (g/10 min) at 190° C./2.16 kg and further from 1 to 1500 grams per 10 minutes (g/10 min) at 190° C./2.16 kg.

In one embodiment, the ethylene-based polymer is selected from ethylene acrylic acid (EAA), ethylene methacrylic acid (EMAA), vinyl acetate, ethyl acrylate, or butyl acrylate. Also, optional secondary comonomers include carbon monoxide, silane-containing comonomers, and others. Terpolymers, such as ethylene-AA-MAA terpolymers may also be formed. Other suitable secondary or higher comonomers to be used in the ethylene polymers of the present invention include, but are not limited to, ethylenically unsaturated monomers and especially $C_{3-20}$ alpha-olefins, carbon monoxide, vinyl acetate, and $C_{2-6}$ alkyl acrylates. Other suitable secondary or higher comonomers are described in Ehrlich, P.; Mortimer, G. A.; Adv. Polymer Science; Fundamentals of Free-Radical Polymerization of Ethylene; Vol. 7, pp. 386-448 (1970)—see reference 1.

Additives

One or more additives may be added to a composition comprising an inventive polymer. Suitable additives include stabilizers; fillers, such as organic or inorganic particles, including clays, talc, titanium dioxide, zeolites, powdered metals, organic or inorganic fibers, including carbon fibers, silicon nitride fibers, steel wire or mesh, and nylon or polyester cording, nano-sized particles, clays, and so forth; tackifiers, oil extenders, including paraffinic or napthelenic oils.

Applications

An inventive composition may be employed in a variety of conventional thermoplastic fabrication processes to produce useful articles, including extrusion coatings; dispersion coating; films; and molded articles, such as blow molded, injection molded, or rotomolded articles; foams; wire and cable, fibers, and woven or non-woven fabrics.

Definitions

Unless stated to the contrary, implicit from the context, or customary in the art, all parts and percents are based on weight, and all test methods are current as of the filing date of this disclosure.

The terms "carboxylic acid-containing comonomer," or "comonomer comprising a carboxylic acid," as used herein, refer to an unsaturated organic compound comprising at least one —COOH group.

The term "acid comonomer" as used herein refers to a carboxylic acid-containing comonomer.

Melting temperature, at pressure (P), of the carboxylic acid-containing comonomer, as used herein, is the temperature, at pressure (P), when the last crystal of the comonomer disappears upon depressurization.

The crystallization temperature at pressure (P), of the carboxylic acid-containing comonomer, as used herein, is equal to the melting temperature, at pressure (P), as discussed above.

The "melting temperature at atmospheric pressure" refers to the melting temperature at 1.0 atm pressure.

The "boiling temperature at atmospheric pressure" refers to the boiling temperature at 1.0 atm pressure.

The term "chain transfer coefficient (Cs value)," as used herein, refers to the ratio between the "rate of chain transfer" to the "rate of ethylene propagation." The term "Cs at 130° C. and 1360 atm," refers to the chain transfer coefficient measured at a temperature of 130° C. and at a pressure of 1360 atm. See references 1-6 below.

The term "CTA activity," as used herein, is the product of the chain transfer coefficient (Cs value) with the molar concentration.

The term "CTA system" includes a single CTA or a mixture of CTAs added to the polymerization process, typically to control the melt index. A CTA system or a CTA includes a component able to transfer a hydrogen atom to a growing polymer molecule containing a radical, by which the radical is formed on the CTA molecule, which can then initiate the start of a new polymer chain. CTA is also known as telogen or telomer.

The term "recycled ethylene," as used herein, refers to the ethylene-rich feed streams that are removed from the polymer, for example, in the high pressure and low pressure separators, and the recycled ethylene comprises ethylene, other components and reactants not converted in the reactor.

The term "reaction zone," as used herein, refers to a reactor zone where polymerization reaction is initiated or reinitiated by, for example, addition of radicals or components which dissociate into radicals.

The terms "comonomer activity," or "comonomer reactivity" as used herein, refer to the reactivity ratios r1 and r2, which discloses information of the reaction rate of the comonomer versus the "rate of ethylene propagation." See Ehrlich/Mortimer reference 1 for definitions and typical values for r1 and r2.

The terms "solvent system" or "cosolvent system," refers to a compound or a mixture of compounds for diluting carboxylic acid. Solvent or cosolvent system may be a vinyl containing monomer(s), maybe an organic peroxide diluent, or may be a chain transfer agent.

The term "compound," as used herein, refers to an organic molecule. A compound may be a vinyl containing monomer, may be an organic peroxide diluent, and/or may be a chain transfer agent.

The term "composition," as used herein, refers to a mixture of materials which comprises the composition, as well as reaction products and decomposition products formed from the materials of the composition.

The term "polymer" refers to a compound prepared by polymerizing monomers, whether of the same or a different type. The generic term polymer thus embraces the term homopolymer (which refers to polymers prepared from only one type of monomer, with the understanding that trace amounts of impurities can be incorporated into the polymer structure), and the term "interpolymer" as defined infra. Trace amounts of impurities may be incorporated into and/or within the polymer structure The term "interpolymer" refers to polymers prepared by the polymerization of at least two different types of monomers. The generic term interpolymer includes copolymers (which refers to polymers prepared from two different monomers), and polymers prepared from more than two different types of monomers.

The term "ethylene-based polymer" or "ethylene polymer" refers to a polymer that comprises a majority amount of polymerized ethylene based on the weight of the polymer, and, optionally, may comprise at least one comonomer.

The term "ethylene-based interpolymer" or "ethylene interpolymer" refers to an interpolymer that comprises a majority amount of polymerized ethylene, based on the weight of the interpolymer, and at least one comonomer.

The term "ethylene-based copolymer" or "ethylene copolymer" refers to an interpolymer that comprises a majority amount of polymerized ethylene, based on the weight of the copolymer, and only one comonomer (thus, only two monomer types).

The term "ethylene-based terpolymer" refers to an interpolymer that comprises a majority amount of polymerized ethylene, based on the weight of the copolymer, and only two comonomers (thus, only three monomer types).

The terms "autoclave-based products" or "autoclaved-based polymers," as used herein, refer to polymers prepared in a reactor system comprising at least one autoclave reactor.

The phrase "high pressure, free-radical polymerization process," as used herein, refers to a free radical initiated polymerization carried out at an elevated pressure of at least 1000 bar (100 MPa).

The term "compressed comonomer/compound mixture" refers to a comonomer/compound mixture at a pressure of greater than 500 bar, more preferably greater than, or equal to, 1000 bar, more preferably greater than, or equal to, 1500 bar.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Test Methods

Density: Samples for density measurement are prepared according to ASTM D 1928. Polymer samples are pressed at 190° C. and 30,000 psi (207 MPa) for three minutes, and then at 21° C. and 207 MPa for one minute. Measurements are made within one hour of sample pressing using ASTM D792, Method B.

Melt Index: Melt index, or $I_2$, (grams/10 minutes or dg/min) is measured in accordance with ASTM D 1238, Condition 190° C./2.16 kg. $I_{10}$ is measured with ASTM D 1238, Condition 190° C./10 kg.

EXPERIMENTAL

Reagents

Table 1 lists the reagents used in the studies below, the supplier, and their purity of the tested carboxylic acids, cosolvents and secondary comonomers.

TABLE 1

| Reagents | | |
|---|---|---|
| Product | Company | Purity |
| Acrylic acid | Aldrich | Anhydrous, contains 180-200 ppm MEHQ as inhibitor, Purity 99% |
| Methacrylic acid | Aldrich | Contains 250 ppm MEHQ as inhibitor, Purity 99% |
| Butanone-2 | Fluka | Purity ≥99.0% (GC) |
| 1-Propanol | Gruessing | Purity 99% |
| Tert-Butyl acetate | Aldrich | Purity ≥99.0% |
| Eyhyleneglycol | Fluka | Purity ≥99.5% |
| Ethyl acetate | Sigma-Aldrich | Purity ≥99.5% |
| Methanol | Fisher Scientific | Purity ≥99.99% |
| Tert-Butanol | Sigma-Aldrich | Anhydrous, Purity ≥99.5% |
| Ethyl acrylate | Fluka | Purity ≥99.0% |
| Vinyl acetate | Aldrich | Contains 3-20 ppm hydroquinone, Purity ≥99.0% |
| Acetone | Merck | p.a. |
| Isododecane (2,2,4,6,6 pentamethyl heptane | Akzo Nobel | Not available |

High Pressure—Melting Temperature/Crystallization Temperature Reduction Study

The high-pressure cell for visual observation of liquid/solid or liquid/liquid phase equilibrium, up to 3,000 bar, is shown in FIG. 1. FIG. 1 shows the following equipment parts: flange, moveable piston; cell body; steel cap; sheathed thermocouple; plug; bolt; sapphire window; cooling jacket; TEFLON O-ring; connecting plug to the pressurizing system; pressurizing fluid (heptane); internal volume with stirrer bar.

Peroxide/solvent mixtures were contained in a high-pressure cell of FIG. 1, with a variable internal volume. The cylindrical cell body (170 mm length with inner and outer diameter of 22 and 80 mm, respectively) was sealed conically, with a steel plug on each side of the cylindrical cell body. The plugs were pressed against the cell body with six bolts on each side of the cylindrical cell body. Tightly fitted into the internal boring was a moveable piston sealed with a TEFLON O-ring, which separated the mixture under investigation from heptanes, which acted as the pressurizing fluid. Through one of the capillary borings, at right angle to the cylindrical axis, a sheathed thermocouple was introduced into the peroxide solution. The flat surface of the moveable piston, which faced the sapphire window (of 18 mm diameter and 10 mm thickness) was polished to facilitate observation of phase behavior, in particular of the appearance and disappearance of crystals. The internal volume was monitored by an endoscope camera, and the pictures were permanently displayed on a screen. The pictures also included the actual pressure and temperature readings, to enable a more detailed analysis of the phase behavior. The pressure was recorded by a transducer (DMS 3 kbar, HBM-Messtechnik) in the ambient-temperature part of the heptane system. A cryostat, operated with methanol, was used for thermostatting the autoclave. The cooling fluid was passed through a brass mantle, which was closely fitted to the outer wall of the high-pressure cell. The temperature was measured within ±0.3° C., via the thermocouple sitting inside the mixture under investigation. The liquid mixture was stirred by a TEFLON-coated magnet, driven through the non-magnetic wall of the stainless-steel cell body (RGT 601, German Werkstoff-No. 2.4969, Arbed Saarstahl) by a large rotating magnet positioned under the autoclave.

The experimental procedure was as follows. The sapphire window was fixed on the right-hand side plug (see FIG. 1) and this plug sealed against the cell body. From the opposite side of the autoclave, the peroxide solution was filled into the internal volume, followed by introducing the moveable piston into the cylindrical boring. Subsequently, the second plug was sealed against the cell body, heptane was filled into the pressurizing unit, and a pressure of about 100 bar was applied. The thermostating mantle was connected with the pre-cooled thermostat, and the autoclave brought to the lowest temperature selected for a particular experimental series. After reaching constant temperature, the pressure was raised, until solidification occurred. Because of delayed nucleation, and as general practice, the pressure associated with the solid/liquid equilibrium was determined at the point when the last crystal disappears upon depressurization (the pressure at this point was recorded as the pressure at the set melting temperature; or Tm at recorded pressure). For measuring such a point, the pressure was lowered in steps of about 50 bar, each step being followed by temperature equilibration.

Melting temperature at pressure (P), as used herein, is the temperature at pressure (P) when the last crystal of the "carboxylic acid-containing comonomer" disappears upon depressurization. The crystallization temperature at pressure (P), as used herein, is equal to the melting temperature at pressure (P), as discussed above.

Homogeneous-phase behavior could be easily seen from the twofold penetration of the clear solution by the illuminating the light, which was reflected at the polished flat surface of the moveable piston. As a first indication of crystallization, the internal volume turned slightly dark. Subsequently, crystals could be seen, and finally, the rotation of the magnetic stir bar ceased. Crystallization was additionally indicated by a rise in temperature. Comparison of crystallization and melting conditions, revealed that excess pressures, of up to 500 bar, had to be applied, in order to induce crystallization. This extra pressure may be considered as some safety margin with respect to preventing solidification, although it needs to be kept in mind, that the extent of undercooling may vary with the specific conditions of the crystallization process. In several of the earlier experiments, even after complete melting, the fluid phase was found to stay opaque down to low pressure, where the fluid mixture, before pressurization, had been fully transparent. This observation is assigned to small quantities of water introduced during sample preparation. In order to eliminate unclear phase observations due to this effect, the entire set of experimental data described below were determined on dried solutions.

Figure 2:
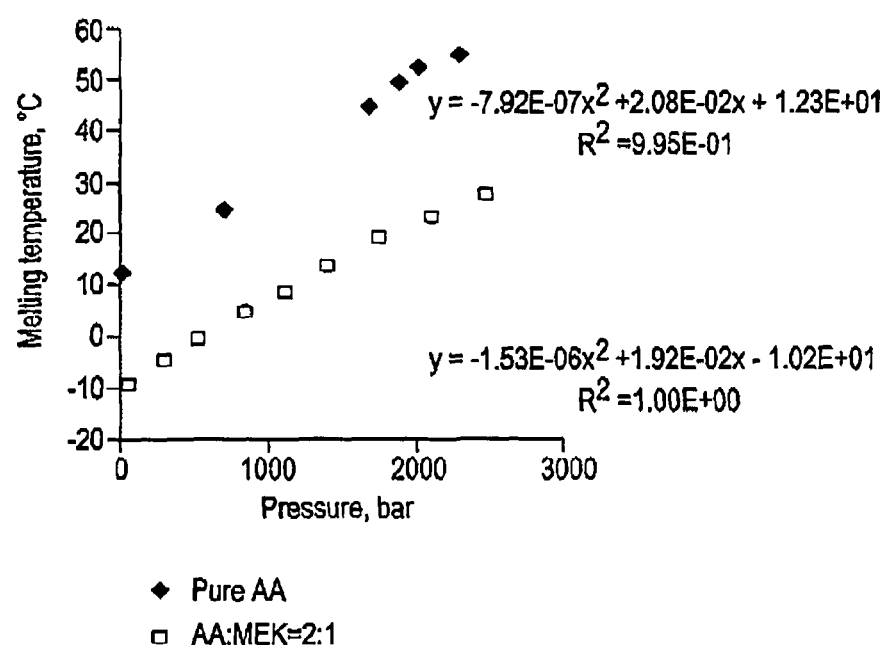
FIG. 2 depicts two melting temperature profiles of acrylic acid, and of an acrylic acid/MEK mixture, each as a function of pressure.

Table 2 shows the main physical and/or chemical properties of the tested carboxylic acids, cosolvents and secondary comonomer. FIG. 2 shows the experimental data, fitting melting temperature of AA and AA/compound mixtures as function of pressure. In particular, FIG. 2 below shows the measured melting points of acrylic acid (AA) and AA:MEK system at molar ratio 2:1. The observed melting temperatures and pressure levels associated with the pure AA and the "AA:MEK system at molar ratio of 2:1" are listed in Table 3. The pressure examined in this "melting point reduction" study correlate with typically pressures used in an high pressure reactor, and the "Tm versus pressure" equations (for example, see Table 4) can be used to predict melting temperature reductions at pressures above 2500 bar.

TABLE 2

Physical properties of selected monomers and cosolvents

| Component | Tmp, °C.[a] | Tbp, °C.[b] | Molecular weight, g/mole | Dielectric Constant[c] | Dipole Moment, Debye[d] | Cs at 1360 atm and 130° C.[e] |
|---|---|---|---|---|---|---|
| Acetone | −95 | 56 | 58 | 20.7 | 2.88 | 0.0168 |
| Butanone-2 (MEK) | −86 | 80 | 72 | 18.5 | 2.76 | 0.06 |
| Methanol | −98 | 65 | 32 | 32.6 | 1.7 | 0.0021 |
| Ethyleneglycol | −16 | 197 | 62 | 37.7 | 2.41 | Not available |
| 1-Propanol | −126 | 97 | 60 | 20.1 | 1.679 | Not available |
| tert-butanol | 25-26 | 82-83 | 74 | 10.9 | 1.67 | 0.0002 |
| Ethyl acetate (EA) | −83.6 | 77 | 88 | 6 | 1.78 | 0.0045 |
| tert-butyl acetate |  | 97-98 | 116 | 5.67 | 1.919 | 0.004 |
| Iso-octane |  | 99 |  | 1.95 | 0 | 0.0064 |
| Isododecane |  | 176-192 | 170 | 2 | 0 | Not available |
| Acrylic acid | 14 | 141 | 72 | Not available | 1.46 | Not available |
| Methacrylic acid | 14-15 | 161 | 86 | Not available | 1.65 | Not available |
| Vinyl acetate | −93 | 72.7 | 86 | Not available | 1.79 | Not available |
| Ethyl Acrylate | −71 | 99.4 | 100 | Not available | Not available | Not available |

[a]Melting point temperature at atmospheric pressure (CRC Handbook of Data on Organic Compounds - see reference 10 below).
[b]Boiling point temperature at atmospheric pressure (CRC Handbook of Data on Organic Compounds - see reference 10 below).
[c]Dielectric constant (CRC Handbook of Chemistry and Physics - see references 11 and 12 below).
[d]Dipole moment (CRC Handbook of Chemistry and Physics - see references 11 and 12 below).
[e]Cs-values at 1360 atm and 130° C. (Mortimer references - see references 1-6 below).

TABLE 3

Melting temperature as function of pressure for Acrylic Acid and Acrylic Acid/MEK Mixtures

| System Melting point, T(° C.) | AA Pressure, bar | AA:MEK = 2:1 mole ratio Pressure, bar |
|---|---|---|
| 13.0* | 1* |  |
| 25.0 | 700 |  |
| 49.6 | 1890 |  |
| 52.4 | 1993 |  |
| 54.6 | 2265 |  |
| 54.5 | 2280 |  |
| 44.7 | 1662 |  |
| −9.3 |  | 50 |
| −4.7 |  | 290 |
| −0.5 |  | 530 |

TABLE 3-continued

Melting temperature as function of pressure for Acrylic Acid and Acrylic Acid/MEK Mixtures

| System Melting point, T(° C.) | AA Pressure, bar | AA:MEK = 2:1 mole ratio Pressure, bar |
|---|---|---|
| 4.8 | | 830 |
| 9.2 | | 1100 |
| 13.7 | | 1400 |
| 18.6 | | 1750 |
| 23.3 | | 2100 |
| 27.8 | | 2450 |

*CRC Handbook of Data on Organic Compounds - see reference 10 below.

Using a second order polynominal, a line was fitted through the data points. The R-square values suggest a very good fit. Similar line fitting have been established for other investigated systems, see Table 4 below.

Table 4 shows the equation factors derived, when applying a second order polynomial to the measured melting point (of mixture or of comonomer, as noted in Table 4), as function of pressure level. For each carboxylic acid/cosolvent mixture, and for each molar ratio, a separate equation was derived, as function of pressure. A separate equation was also derived for each pure comonomer as a function of pressure. At a given pressure, the melting point reduction ($\Delta Tm = Tm_{mixture} - Tm_{comonomer}$), obtained by using a cosolvent (compound) at certain molar ratio, can be calculated by subtracting the melting point of the carboxylic acid from the melting point of the carboxylic acid/cosolvent mixture. The derived equation can be used to calculate the needed melting points. As discussed above, the crystallization temperature at pressure (P) is equal to the melting temperature at pressure (P).

TABLE 4

Modeling of melting temperature as function of pressure from measured data

| Equation: Tm = F (Pressure) | | Tm (° C.)$^A$ = a * (p (bar))$^2$ + b * p (bar) + c | | |
|---|---|---|---|---|
| Comonomer | comonomer:compound (cosolvent) molar ratio | a | b | c |
| Acrylic acid (AA) | | | | |
| AA | pure | -7.92E-07 | 0.0208 | 12.3 |
| Compound | AA/compound | | | |
| Acetone | 2:1 | -1.49E-06 | 0.0192 | -9.44 |
| MEK | 2:1 | -1.53E-06 | 0.0192 | -10.2 |
| Methanol | 2:1 | -1.86E-06 | 0.0198 | -6.51 |
| tert-Butyl acetate | 2:1 | -1.32E-06 | 0.0187 | -10.4 |
| 1-Propanol | 2:1 | -1.36E-06 | 0.0185 | -6.01 |
| Vinyl acetate | 2:1 | -1.68E-06 | 0.0204 | -7.11 |
| Ethyl acrylate | 2:1 | -1.08E-06 | 0.0186 | -8.61 |
| Ethyl acetate | 2:1 | -1.65E-06 | 0.0197 | -10.0 |
| Ethylene glycol$^B$ | 4:1 | -8.09E-07 | 0.0188 | 5.12 |
| tert-butanol | 4:1 | -1.47E-06 | 0.0197 | 1.88 |
| Isododecane | 4:1 | -1.56E-06 | 0.0217 | 7.21 |

TABLE 4-continued

Modeling of melting temperature as function of pressure from measured data

| Equation: Tm = F (Pressure) | | Tm (° C.)$^A$ = a * (p (bar))$^2$ + b * p (bar) + c | | |
|---|---|---|---|---|
| Comonomer | comonomer:compound (cosolvent) molar ratio | a | b | c |
| Ethyl acetate | 4:1 | -1.68E-06 | 0.0205 | -0.55 |
| Ethyl acetate | 0.6:1 | -1.25E-06 | 0.0166 | -37.9 |
| Ethyl acetate | 0.2:1 | | 0.012 | -64.1 |
| Methacrylic acic (MAA) | | | | |
| MAA | pure | 2.90E-06 | 0.0328 | 14.4 |
| Compound | MAA/compound | | | |
| Ethyl acetate | 2:1 | -2.32E-06 | 0.0248 | -12.7 |

$^A$The respective equation for Tm, as shown in Table 4, is used to calculate the Tm (at the specified pressure) of the comonomer; or the Tm (at specified pressure) in the comonomer/compound mixture.
$^B$Bifunctional alcohol.

As discussed above, the respective equations in Table 4 were derived from the respective data in Table 3, and derived from similar respective data for other investigated systems. For other types of comonomers, not listed in Table 4, respective equations can also be derived by performing similar "high pressure—melting temperature/crystallization temperature reduction studies," as discussed above, and treating each generated data set using a second order polynominal fit.

Table 5 lists the temperature and melting temperature reduction of "AA/compound" systems at varying pressures. The data in Table 5 show that the largest melting reductions of AA (acrylic acid) are provided by acetates and ketonic solvents. The lowest melting reduction was measured for isododecane. Since isododecane is a non-polar solvent, it cannot interfere with hydrogen bonding, leading to anhydride formation between two carboxylic acid molecules (dimer formation, see reference 9 below). It was surprisingly discovered that alcohols reduced the melting temperature to a lower degree, compared to the acetates and ketonic solvents, although an alcohol potentially could interfere more effectively the hydrogen bonding between the carboxylic acid groups on two or more comonomer molecules. The impact on the reduction of melting temperature of ethylene glycol is rather minimal. The bifunctionality of this glycol reduces the melting temperature to a low degree. Surprisingly, however, it was discovered that secondary polar comonomers, like vinyl acetate, etc., effectively reduced the melting temperature of carboxylic acid-containing monomer. These findings will enable improve polymerization processes of ethylene with carboxylic acid-containing comonomer(s), by the use of selected compounds (for example, cosolvents and/or other polar comonomers), to avoid the undesirable crystallization of the carboxylic acid-containing comonomer(s), in the feed lines and in the compressing devices (for example, pumps and compressors) of the polymerization system.

TABLE 5

Melting temperature of comonomer; melting temperature of comonomer/compound mixture; and melting point reduction Tm reduction = ΔTm
(ΔTm = Tm$_{mixture}$ − Tm$_{comonome}$)

| Comonomer | comonomer:compound molar ratio | Tm at 1 bar | Tm at 1500 bar | Tm at 2500 bar | Δ Tm at 1 bar | Δ Tm at 1500 bar | Δ Tm at 2500 bar |
|---|---|---|---|---|---|---|---|
| Acrylic acid (AA) | | | | | | | |
| AA | pure | 12.3* | 41.7* | 59.4* | 0.0 | 0.0 | 0.0 |
| Compound | | | | | | | |
| | AA/compound | | | | | | |
| Acetone | 2:1 | −9.4** | 16.0** | 29.2** | −21.7*** | −25.7*** | −30.1*** |
| MEK | 2:1 | −10.2** | 15.2** | 28.2** | −22.5*** | −26.6*** | −31.1*** |
| Methanol | 2:1 | −6.5** | 19.0** | 31.4** | −18.8*** | −22.7** | −28.0*** |
| tert-Butyl acetate | 2:1 | −10.4** | 14.5** | 27.7** | −22.7*** | −27.2** | −31.6*** |
| 1-Propanol | 2:1 | −6.0** | 18.7** | 31.7** | −18.3*** | −23.0** | −27.6*** |
| Vinyl acetate[A] | 2:1 | −7.1** | 19.7** | 33.4** | −19.4*** | −22.0*** | −26.0*** |
| Ethyl acrylate[A] | 2:1 | −8.6** | 16.9** | 31.1** | −20.9*** | −24.9** | −28.2*** |
| Ethyl acetate | 2:1 | −10.0** | 15.8** | 28.9** | −22.3*** | −25.9*** | −30.4*** |
| Ethyl acetate | 0.6:1 | −37.4** | −15.3** | −3.7** | −−49.7*** | −57*** | −63.1*** |
| Ethyl acetate | 0.2:1 | −64.1** | −46.1** | −34.1** | −76.4*** | −87.8*** | −93.5*** |
| Ethylene glycol[B] | 4:1 | 5.1** | 31.5** | 47.1** | −7.2*** | −10.2*** | −12.3*** |
| tert-butanol | 4:1 | 1.9** | 28.1** | 41.9** | −10.4*** | −13.6*** | −17.4*** |
| Isododecane | 4:1 | 7.2** | 36.3** | 51.7** | −5.1*** | −5.5*** | −7.6*** |
| Ethyl acetate | 4:1 | −0.5** | 26.4** | 40.2** | −12.9*** | −15.3*** | −19.2*** |
| Methacrylic acid (MAA) | | | | | | | |
| MAA | pure | 14.4* | 57.1* | 78.3* | 0.0 | 0.0 | 0.0 |
| | MAA/Compound | | | | | | |
| Ethyl acetate | 2:1 | −12.7** | 19.3** | 34.8** | −27.1*** | −37.8*** | −43.5*** |

[A]Compound was a comonomer.
[B]Bifunctional alcohol.
*The Tm of comonomer, at specified pressure, as determined using respective equation in Table 4.
**The Tm of the comonomer/compound mixture, as determined using respective equation in Table 4.
***ΔTm = Tm (comonomer/compound mixture, at specified pressure) − Tm (comonomer, at specified pressure)

Figure 3:
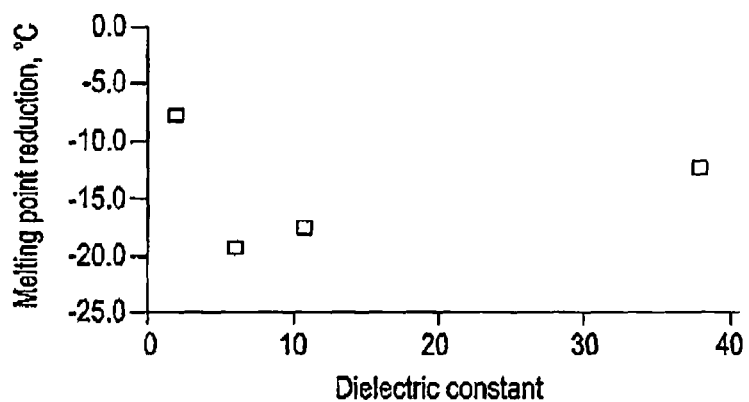
FIG. 3 depicts the melting temperature reduction ($\Delta Tm = Tm_{mixture} - Tm_{AA}$) as a function of the dielectric constant of several cosolvents (compounds).

FIG. 3 depicts the melting temperature reduction (ΔTm=Tm$_{mixture}$−Tm$_{comonome}$) versus as function of dielectric constant, using acrylic acid/solvent at molar ratio of acrylic acid to solvent=4:1. As seen from FIG. 3, that there is no obvious correlation between melting temperature reduction and the dielectric constant of the solvent, applied at a molar ratio of AA:solvent=4:1. The solvent (isododecane) with the lowest dielectric constant gave the lowest reduction in melting temperature, while ethylene glycol (bifunctional alcohol) with the highest dielectric constant gave the second lowest reduction. Furthermore ethyl acetate, with a dielectric constant 6, performed better than tert-butanol, with a dielectric constant of 10.9.

Figure 4:
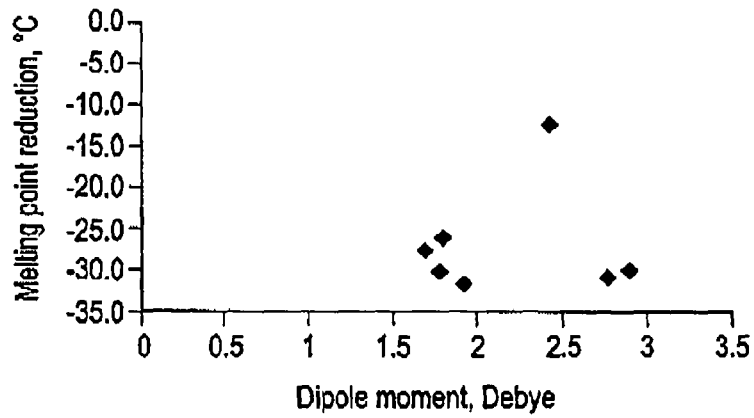
FIG. 4 depicts the melting temperature reduction ($\Delta Tm = Tm_{mixture} - Tm_{AA}$) as a function of the dipole moment of several cosolvents (compounds).

FIG. 4 depicts the melting temperature reduction (ΔTm=Tm$_{mixture}$−Tm$_{comonome}$) versus as function of dipole moment, using acrylic acid/solvent at molar ratio of acrylic acid to solvent=2:1. Note, the AA/ethylene glycol system, measured at 4:1 molar ratio, data has been added to this data set, since ethylene glycol is a bifunctional alcohol. As seen from FIG. 4, that there is no correlation between melting temperature reduction of acrylic acid and the dipole moment of the solvent, applied at a molar ratio of AA:solvent=2:1. The additional data point of the AA/ethylene glycol system, measured at 4:1 molar data, does not provide additional insight. Despite their widely varying dipole moment, the tested acetates and ketones provide the largest reduction in melting temperature. The tested alcohol, propanol-1, and vinyl acetate showed less reduction (smaller delta) in the melting temperature (=melting point). It is speculated that that the alcohols form stronger bonds with carboxylic acid, by which the melting temperature is less reduced, as compared to compounds which form a weaker bonding interaction with the carboxylic acid.

Figure 5:
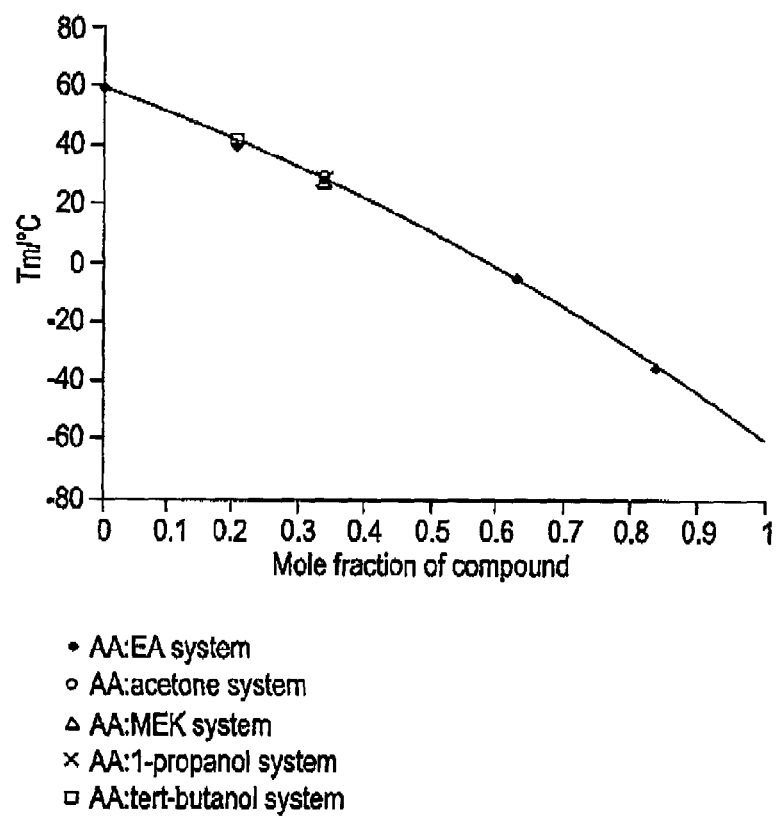
FIG. 5 depicts the melting point of AA/Compound mixtures at the noted compositions, and 2500 bar.

FIG. 5 shows the melting point temperature of acrylic acid/compound mixtures, at the noted compositions, at 2500 bar. With the help of the "pure AA" and AA/Ethyl acetate data, measured at varying compositions, it was possible to fit a line through the data points. A good fit was achieved in the compound mole fraction range from 0 to 0.83, suggesting that eutectic minimum is to be expected at mole fraction above 0.83. The atmospheric melting point temperature data for pure ethyl acetate and for the AA/Ethyl acetate mixture with a molar ratio of 0.2:1 of respectively −83.6 and −64.1° C. suggest that the eutectic minimum lies close to the melting point of the pure compound. The other investigated compounds, except ethylene glycol and tert-butanol, have similar, or even lower, atmospheric melting points. Combining the pure compound melting point with AA/compound measurements, and the trend observed for the AA/ethyl acetate system, suggest that also with these system, the eutectic minimum will be positioned close the melting point of the pure compound. For compounds with an atmospheric melting point closer or above the melting of the involved carboxylic acid comonomer, the eutectic minimum will move respectively to a mole fraction equal, or larger than, 0.5, or equal, or less than, 0.5. In FIG. 5 the data point for AA/tert butanol system show, at 2500 bar, similar melting point reduction, as compared to other AA/compound systems; however tert-butanol is not a preferred compound, due to the expected position of the eutectic minimum at a mole fraction of compound below 0.5. Furthermore, the high melting point of the pure compound (tert-butanol), in the applied pressure range, does not allow it to be used effectively in a high pressure pump and injection system, as a cleaning, start-up and/or transitioning solvent.

Chain Transfer Activity Considerations:

Table 6 shows the cosolvent (compound) needed to maintain the molar ratio, AA:solvent, at 2:1, at varying AA levels. The varying AA levels reflect the feed conditions for interpolymers made at varying acid levels. The molecular weight of the cosolvent (compound) has a further influence on the weight percent of cosolvent needed. The type of chain transfer agent has a strong impact on the chain transfer activity and the melt-index capability of the final polymerization system.

TABLE 6

Wt % of cosolvent at varying level of AA
to maintain the mole ratio AA:solvent at 2:1

| Cs at 1360 atm and 130° C. | Component | Wt % of cosolvent at varying wt % AA conc and a molar ratio of 2:1 (AA:cosolvent) | | | Relative CTA activity |
|---|---|---|---|---|---|
| | Acrylic acid, wt % | 4 | 2 | 1 | |
| 0.0168 | Acetone | 1.61 | 0.81 | 0.40 | 28.0% |
| 0.06 | Butanone-2 | 2.00 | 1.00 | 0.50 | 100.0% |
| 0.0045 | Ethyl acetate (EA) | 2.44 | 1.22 | 0.61 | 7.5% |
| 0.004 | tert-Butyl actate | 3.22 | 1.61 | 0.81 | 6.7% |

Variations in the level of cosolvent (compound), example, a polar cosolvent, as well as variations in chain transfer activity, make the combined production of ethylene-based/"carboxylic acid-containing comonomer" interpolymers, with diverse melt index (MI) and acid levels, very difficult, or impossible. Furthermore, variations in the level of cosolvent will make it impossible to optimize the impact of the cosolvent on the phase equilibria in the compressor(s) and in the reactor system (see references 8 and 9). The phase equilibria in these systems will benefit from a constant and significant level of cosolvent in the process. These conditions are met in the invention, by application of a mixed polar cosolvent system. By applying two or more polar cosolvents with varying chain transfer activities, a significant level of polar cosolvent can be maintained, regardless of the level of acid monomer, or the melt index of the product to be produced. The significant level of polar cosolvent will ensure a positive impact on the "AA/cosolvent" melting temperature, the reactor cloud point pressure, and the phase homogeneity in the high pressure compression systems.

An example of a mixed cosolvent system is shown in Table 7 below. Despite the strong variation in MEK level, from 0.5 to 3 vol %, the same variation in chain transfer activity can be supplied by a mixed MEK/ethyl acetate system, while maintaining the overall level of polar cosolvent at 5 vol %, and thus, maintaining a positive level of polar cosolvent on critical phase equilibria, in a high pressure polymerization of ethylene with one or more carboxylic acid-containing comonomers.

TABLE 7

Control of level polar cosolvent by selection of mixed cosolvent system

| Chain transfer activity required to control melt-index (refer to Table 2 for Cs values) | | | | |
|---|---|---|---|---|
| Single MEK CTA system, vol %, based on total volume of components in the reactor feed | 0.5 | 1 | 2 | 3 |
| Mixed MEK/ethyl acetate CTA system | | | | |
| MEK, vol % | 0.14 | 0.68 | 1.76 | 2.86 |
| Ethyl acetate (EA), vol % | 4.87 | 4.33 | 3.24 | 2.14 |

Figure 6:
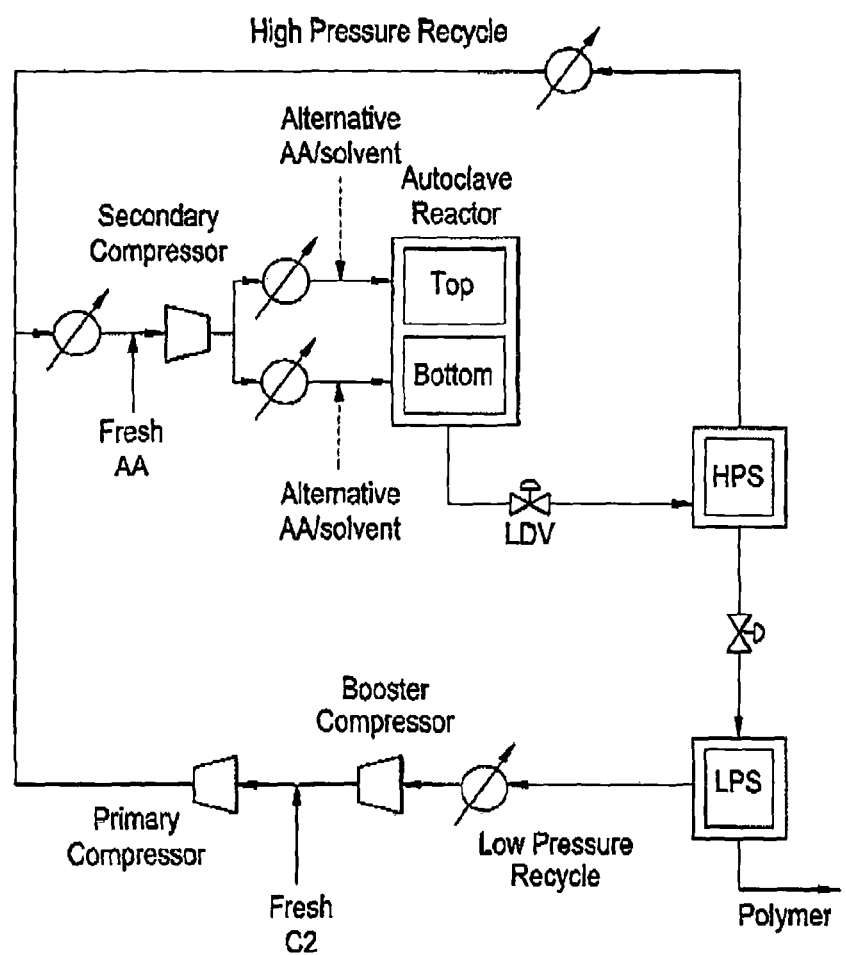
FIG. 6 is a schematic of a flow diagram for an interpolymer polymerization system comprising a two zone autoclave reactor.

FIG. 6 depicts a flow diagram for a copolymer (ethylene-based polymer) polymerization containing a two zone autoclave reactor. As seen in FIG. 6, fresh ethylene is compressed together with the outlet of the booster compressor, by the primary compressor, to the suction pressure of the secondary compressor. The feed of the secondary compressor consists of ethylene rich feed streams, coming from the high pressure recycle and the primary compressor outlet. Additional monomers, including carboxylic acid-containing monomer(s), can be fed at the inlet side of the secondary compressor, or further downstream of the secondary compressor. In FIG. 6, the discharge stream of the secondary compressor is split into two feedstreams. These feedstreams pass coolers, and could receive, according to the present invention, a high pressure feed of carboxylic acid, mixed with a cosolvent and/or secondary comonomers (or compounds). These feed streams are fed to the autoclave top reactor zone and autoclave bottom reactor zone, respectively. After pressure let down by the LDV (Let Down Valve), the reactor outlet stream is received, and separated, in the high pressure separator (HPS). The gaseous overhead is cooled, and cleaned from entrained polymer and/or dissolved waxes in the high pressure recycle. The liquid bottom stream from the HPS is further depressurized in the low pressure separator (LPS). The polymer, with residual monomers, CTA and/or solvents, is transferred to the product finishing section.

The gaseous overhead of the LPS is cooled in the LPR (Low Pressure Recycle), and compressed and cooled in the booster compressor. Depending on the applied pressure, the applied temperature, and the boiling points of the raw materials, various components, like CTA(s), cosolvent(s), comonomer(s) and other compounds, may condense and separate, and be removed in the various compression and cooling stages. The remaining gaseous flow from the booster compressor is fed to the primary compressor. The polymerization flow diagram shown in FIG. 6, can be used to polymerize ethylene with one or more carboxylic acid-containing comonomers, and optionally, other comonomers, without the undesirable crystallization of the carboxylic acid-containing comonomer(s) in the feeds, compression equipment and/or pump equipment contained in the polymerization process. Furthermore, this polymerization flow scheme allows for the condensation and reuse of cosolvents.

Ehrlich and Mortimer:
1. P. Ehrlich, G. A. Mortimer; Fundamentals of the free radical polymerization of ethylene; Adv. Polymer Sci., 1970, Vol 7, 386-448.

Mortimer: Cs Values of CTA Agents
2. G. Mortimer; Journal of Polymer Science: Part A-1; Chain transfer in ethylene polymerization; vol 4, p 881-900 (1966).
3. G. Mortimer; Journal of Polymer Science: Part A-1; Chain transfer in ethylene polymerization. Part IV. Additional study at 1360 atm and 130° C.; vol 8, p1513-1523 (1970).

4. G. Mortimer; Journal of Polymer Science: Part A-1; Chain transfer in ethylene polymerization. Part V. The effect of temperature; vol 8, p1535-1542 (1970).
5. G. Mortimer; Journal of Polymer Science: Part A-1; Chain transfer in ethylene polymerization. Part VI. The effect of pressure; vol 8, p1543-1548 (1970).
6. G. Mortimer; Journal of Polymer Science: Part A-1; Chain transfer in ethylene polymerization VII. Very reactive and depleteable transfer agents; vol 10, p 163-168 (1972).

Ethylene/EAA Phase Separation Data (Cloud Point) from External Literature

7. Carsten Beyer and Lothar R. Oellrich, "Solvent studies with the system Ethylene/Poly(ethylene-co-acrylic acid): Effects of solvent, density, hydrogen bonding, and copolymer composition", Helvetica Chimica Acta; Vol. 85 (2002); pp 659-670.
8. S-H Lee, M. A. LoStracco, B. M. Hasch and M. McHugh, "Solubility of Poly(ethylene-co-acrylic acid) in Low molecular weight hydrocarbons and dimethylether. Effect of copolymer concentration, solvent quality and copolymer molecular weight", J. Phys. Chem., 1994, 98, 4055-4060.

AA Dimer Formation

9. Octocka, E. P.; Kwei, T. K., Macromolecules, 1968, 1, 244. The Melting Point Data for the Pure Compounds are: AA (13° C.) and MAA (16° C.)
10. CRC Handbook of Data on Organic Compounds" Volume I (A-O), Robert C. Weast, Melvin J. Astle (eds.); CRC Press. Inc., Boca Raton, Fla. (U.S.A.) ISBN 0-8493-0401-6.

Dipole Moments and Dielectric Constants:

11. "CRC Handbook of Chemistry and Physics"; 92nd edition, 2011.
12. "CRC Handbook of Chemistry and Physics"; 49th edition, 1968.

The invention claimed is:

1. A method of injecting a compressed "comonomer/compound mixture," comprising a "comonomer comprising a carboxylic acid," and at least one compound, into at least one reactor;
    said method comprising, adding the at least one compound to the comonomer to form the "comonomer/compound mixture," prior to compressing and injecting the mixture into the reactor; and
    wherein the crystallization temperature, at pressure P, of the "comonomer/compound mixture" is at least 5° C. lower than the crystallization temperature, at pressure P, of the comonomer, without the presence of the at least one compound; and
    wherein the pressure P is greater than 500 bar; and
    wherein the molar ratio of the at least one compound to the comonomer in the mixture is from 1/10 to 1/1; and
    wherein the comonomer/compound mixture comprises greater than, or equal to, 30 weight percent of the comonomer, based on the weight of the comonomer/compound mixture; and
    wherein the melting temperature, at atmospheric pressure, of the at least one compound is less than the melting temperature, at atmospheric pressure, of the comonomer.

2. The method of claim 1, wherein the at least one compound has a boiling temperature, at atmospheric pressure, greater than, or equal to, 70° C.

3. The method of claim 1, wherein the comonomer/compound mixture comprises less than 2 weight percent ethylene, based on the weight of the mixture.

4. The method of claim 1, wherein the at least one compound is a chain transfer agent.

5. The method of claim 1, wherein the at least one compound has a chain transfer activity coefficient (Cs at 130° C. and 1360 atm) from 0.0025 to 0.5.

6. The method of claim 1, wherein at least two compounds are added to the comonomer, and wherein one compound has a higher Cs value than the other compound.

7. The method of claim 6, wherein the ratio of the "Cs value of the compound with the higher Cs value" to the "Cs value of the other compound" is greater than, or equal to, 2.

8. The method of claim 1, wherein the at least one compound comprises at least one chemical group selected from the following: an alcohol, a ketone, an aldehyde, an ester, a carboxylic acid, a vinyl group, or a combination thereof.

9. A method of forming an ethylene-based polymer, said method comprising polymerizing a comonomer, comprising a carboxylic acid, in the presence of ethylene and at least one free radical initiator; and
    wherein at least one compound is added to the comonomer to form a "comonomer/compound mixture;" and then the mixture is compressed, and injected into at least one reactor; and
    wherein the crystallization temperature, at pressure P, of the "comonomer/compound mixture" is at least 5° C. lower than the crystallization temperature, at pressure P, of the comonomer, without the presence of the at least one compound; and
    wherein the pressure P is greater than 500 bar; and
    wherein the molar ratio of the at least one compound to the comonomer in the mixture is from 1/10 to 1/1; and
    wherein the comonomer/compound mixture comprises greater than, or equal to, 30 weight percent of the comonomer, based on the weight of the comonomer/compound mixture; and
    wherein the melting temperature, at atmospheric pressure, of the at least one compound is less than the melting temperature, at atmospheric pressure, of the comonomer.

10. The method of claim 9, wherein at least some of unreacted ethylene and/or some of unreacted comonomer is/are recycled to a reactor inlet.

11. The method of claim 9, wherein at least some of the compound is condensed and recycled to one or more comonomer feed stream(s).

12. The method of claim 9, wherein the level of the at least one compound in a reactor feed is maintained from 1 to 10 molar percent, based on the total moles of components in the feed.

13. The method of claim 9, wherein the at least one compound is a chain transfer agent.

14. The method of claim 9, wherein the at least one compound comprises at least one chemical group selected from the following: an alcohol, a ketone, an aldehyde, an ester, a carboxylic acid, a vinyl group, or a combination thereof.

15. The method of claim 1, wherein the mixture comprises less than 2 weight percent ethylene, based on the weight of the mixture.

16. The method of claim 9, wherein the mixture comprises less than 2 weight percent ethylene, based on the weight of the mixture.

* * * * *